United States Patent [19]

Morscheck

[11] Patent Number: 5,641,044
[45] Date of Patent: Jun. 24, 1997

[54] DOUBLE-ACTING PIN-TYPE SYNCHRONIZER ASSEMBLY AND SYNCHRONIZER PIN ASSEMBLY

[75] Inventor: Timothy J. Morscheck, Kalamazoo, Mich.

[73] Assignee: Eaton Corporation, Cleveland, Ohio

[21] Appl. No.: 509,365

[22] Filed: Jul. 31, 1995

[51] Int. Cl.⁶ .................................................. F16D 23/06
[52] U.S. Cl. ............................. 192/53.331; 74/339
[58] Field of Search ........................ 192/43.91, 53.1, 192/53.3, 53.31, 53.33, 53.331, 53.332, 109 R; 74/339

[56] References Cited

U.S. PATENT DOCUMENTS

| | | | |
|---|---|---|---|
| 3,286,801 | 11/1966 | Wojcikowski | 192/53.331 |
| 3,695,403 | 10/1972 | Eastwood | 192/53.331 |
| 3,739,890 | 6/1973 | Nolli | 192/53.331 |
| 4,344,335 | 8/1982 | Kawai | 192/53.331 X |
| 4,944,197 | 7/1990 | Stine et al. | 74/477 |
| 4,989,706 | 2/1991 | Morscheck | 192/53.332 |
| 5,078,244 | 1/1992 | Olson | 192/53.332 |
| 5,078,245 | 1/1992 | Nellums et al. | 192/53.332 |
| 5,086,897 | 2/1992 | Reynolds | 192/53.331 |
| 5,092,439 | 3/1992 | Reynolds | 192/53.331 |
| 5,111,922 | 5/1992 | Reynolds | 192/53.331 |
| 5,161,423 | 11/1992 | Ore | 74/339 |

FOREIGN PATENT DOCUMENTS

| | | |
|---|---|---|
| 1058792 | 12/1951 | France . |
| 1210808 | 11/1970 | United Kingdom . |

Primary Examiner—Richard M. Lorence
Attorney, Agent, or Firm—Howard D. Gordon

[57] ABSTRACT

An improved pin-type synchronizer assembly (10) is provided utilizing improved synchronizer pin assemblies (64, 66) which eliminate the need for separate pre-energizing devices. The synchronizer pin assemblies preferably are mounted at each end thereof to a synchronizer ring (52, 54) and include a large diameter portion (68) adjacent one of the synchronizer rings, a small outer diameter portion (70) adjacent the other of the synchronizer rings, and an intermediate outer diameter portion (72) axially intermediate the large and small outer diameter portions. A baulking ramp (96) is defined between the intermediate and large outer diameter portions. The large outer diameter portion (68) is axially movable relative to the synchronizer ring adjacent thereto, and is resiliently biased by a spring (114) or the like to an offset position away from the synchronizer ring adjacent thereto and against a stop member (112).

23 Claims, 9 Drawing Sheets

DOUBLE-ACTING PIN-TYPE SYNCHRONIZER ASSEMBLY AND SYNCHRONIZER PIN ASSEMBLY

BACKGROUND OF THE INVENTION

1. Field of the Invention

The present invention relates to pin-type synchronizer assemblies and synchronizer pin assemblies therefor. In particular, the present invention relates to double-acting pin-type synchronizer assemblies utilizing synchronizer pin assemblies having a large diameter portion, a small diameter and an intermediate diameter portion interposed between the large and small diameter portions, the large diameter portion interacting with apertures in a sliding clutch plate to define baulking means and being axially movable relative to and resiliently biased away from the synchronizer ring associated therewith.

2. Description of the Prior Art

Change-gear transmissions utilizing double-acting pin-type synchronizers and the pin-type synchronizer assemblies therefor, including boosted-type synchronizer assemblies, are known in the prior art, as may be seen by reference to U.S. Pat. Nos. 3,739,890; 4,944,197; 4,989,706; 5,078,244; 5,078,245; 5,086,897; 5,103,952; 5,092,439; 5,111,922; 5,161,423; 5,231,895 and 5,370,013, the disclosures of which are incorporated herein by reference.

While such synchronizer assemblies and the transmissions utilizing same are well received and have had remarkable commercial success, the synchronizer assemblies may be subject to improvement by providing an assembly which eliminates the use of cantilevered pins and/or separate spring pins, spring-biased plungers and/or other pre-energizing devices.

British Patent No. 1,210,808 discloses a double-acting pin-type synchronizer assembly utilizing synchronizer pin assemblies having a large diameter baulking portion and a small diameter portion, the large diameter portion being axially movable and resiliently biased away from its associated synchronizer ring. While eliminating the need for separate pre-energizing means, the disclosed device does not prevent crash shifts if after initiating engagement of a target ratio, the operator attempted to reengage a previously engaged ratio.

SUMMARY OF THE INVENTION

In accordance with the present invention, an improved synchronizer pin assembly and double-acting pin-type synchronizer assembly utilizing same is provided wherein the synchronizer pin assemblies are mounted to synchronizer rings at each end thereof, the requirement for separate pre-energizing devices such as spring pins and/or spring-biased plungers or the like is eliminated, and crash shifts into a previously engaged ratio after initiation of engagement into a target ratio are positively prevented.

The foregoing is accomplished, in a double-acting pin-type synchronizer assembly, by providing two sets of synchronizer pin assemblies, one set associated with each of the two synchronizer rings and associated gears engageable by the synchronizer assembly. Each set of pins includes a plurality of generally equally circumferentially spaced synchronizer pin assemblies, each having a large diameter portion, a small diameter portion and an interposed intermediate diameter portion. The large diameter portions of the pin assemblies interact with apertures in a sliding clutch plate to define baulking means and are axially movable relative to and resiliently biased away from the synchronizer rings associated therewith.

The apertures and pin assemblies are configured to assure that, at initial engagement between the baulking ramps defined by the large diameter portions and the periphery of their associated apertures in the clutch plate, the apertures and large diameter portions are not in register whereby continued axial movement of the clutch plate toward a synchronizer ring will cause axial movement of the large diameter pin assembly portions against the bias to resiliently urge the synchronizer ring into frictional engagement with the associated conical surface on the gear being engaged to properly pre-energize the synchronizer by causing the synchronizer assembly to tend to rotate, or clock, with the gear being engaged.

The pin assemblies and clutch plate apertures are further configured such that as the clutch plate moves from disengaging one of the gears to neutral or toward engaging the other gear, it will pass through a position whereat the apertures therein will engage and/or axially displace the intermediate diameter portions of both sets of pin assemblies whereby the apertures are positively held out of register with the large diameter portions of both sets of pin assemblies and axial movement of the clutch plate in either direction will result in an axial movement of the associated large diameter portions against the bias force and desired pre-energizing.

Accordingly, a new and improved pin-type synchronizer assembly and a synchronizer pin assembly therefor is provided which minimizes cantilevered synchronizer pin mounting, eliminates the requirement for separate pre-energizing devices and, upon initiation of engagement of a target gear ratio, will positively prevent crash shifts if engagement of the previously engaged ratio is attempted.

This and other objects and advantages of the present invention will become apparent from a reading of the detailed description of the preferred embodiment taken in view of the attached drawings.

DESCRIPTION OF THE PREFERRED EMBODIMENT

In the following description of the preferred embodiment, certain terms will be used for convenience in reference only and are not intended to be limiting. The terms "upward," "downward," "rightward" and "leftward" designate directions in the drawings to which reference is made. The words "inward" and "outward" will refer, respectively, to directions toward and away from the geometric center of a device and designated parts thereof. The foregoing applies to the words specifically mentioned, derivatives thereof and words of similar import.

Figure 1:
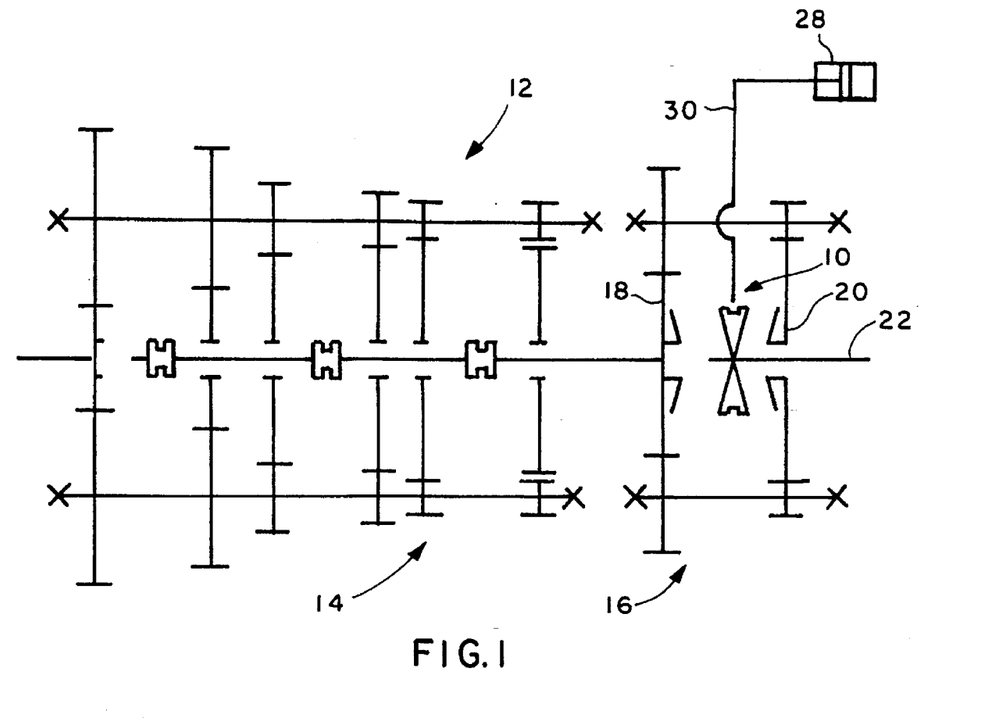
FIG. 1 is a schematic illustration of a change-gear transmission utilizing the pin-type synchronizer assembly of the present invention.
Figure 2:
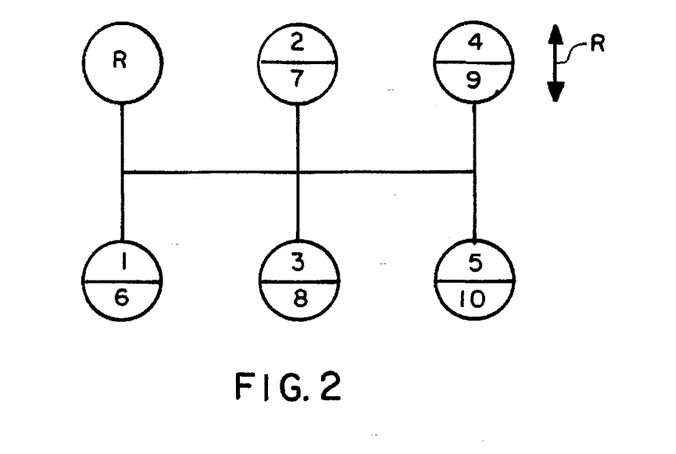
FIG. 2 is a schematic illustration of the shift pattern for the transmission of FIG. 1.
Figure 3:
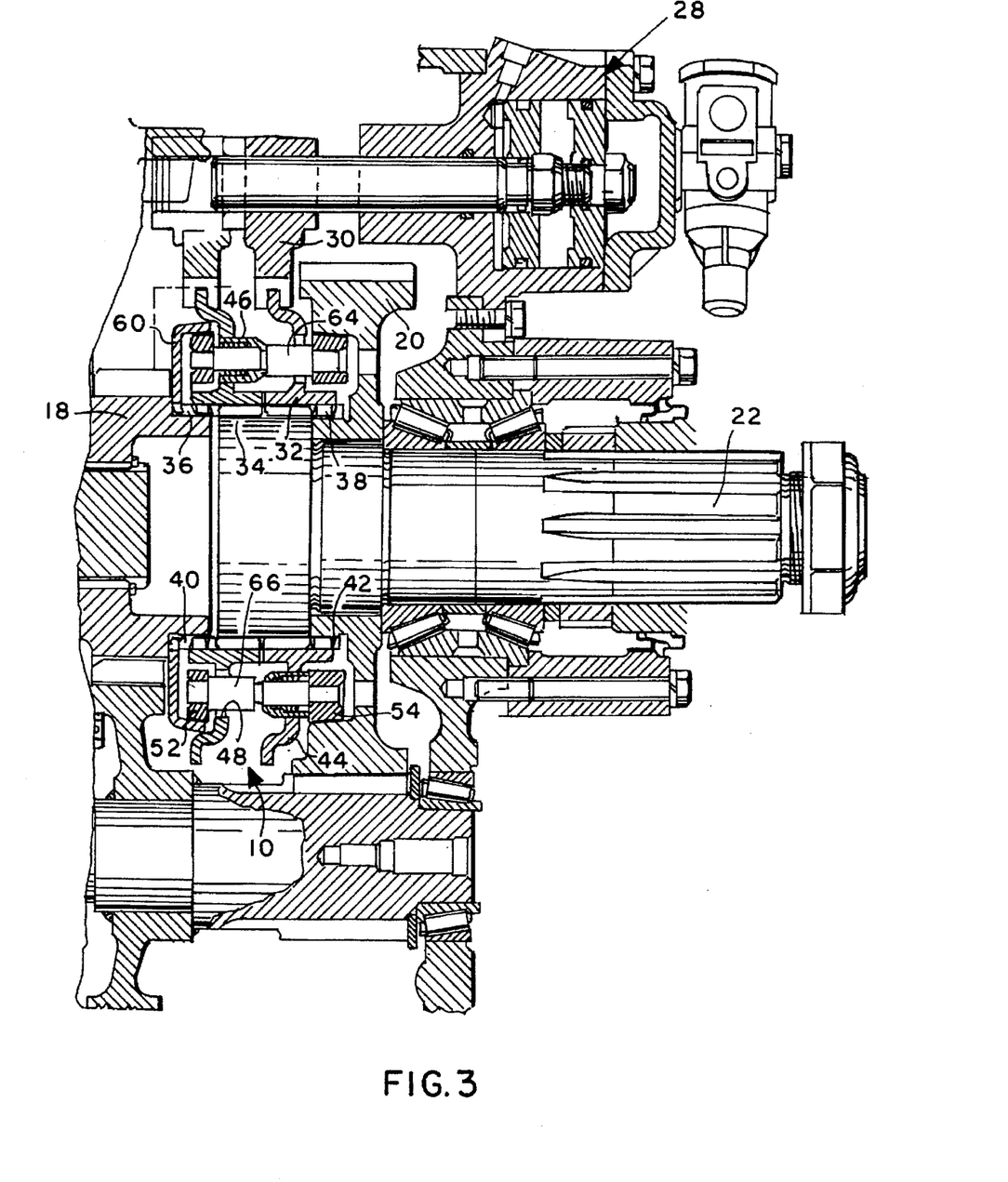
FIG. 3 is an enlarged sectional view of a portion of the transmission of FIG. 1 illustrating the pin-type synchronizer assembly of the present invention.

A change-gear transmission advantageously utilizing the double-acting pin-type synchronizer assembly 10 of the present invention may be seen by reference to FIGS. 1, 2 and 3. Synchronized jaw clutch assemblies for use in change-gear transmissions, usually vehicular change-gear transmissions, are well known in the prior art and examples thereof may be seen by reference to U.S. Pat. Nos. 3,548, 938; 4,059,178 and 4,540,074, the disclosures of which are incorporated herein by reference. Pin-type synchronizers, also known as "Clark-type" synchronizers, also are well known in the prior art, as may be seen by reference to U.S. Pat. Nos. 3,910,390 and 4,018,319, the disclosures of which are incorporated herein by reference.

Referring to FIG. 1, a ten-forward-speed, one-reverse-speed, compound change-gear transmission 12 of the range type is schematically illustrated. Transmission 12 includes a main transmission section 14 connected in series with a range-type auxiliary transmission section 16 and utilizes double-acting, pin-type range synchronizer assembly 10 to clutch either gear 18 or gear 20 to output shaft 22. The shift pattern for transmission 12 is schematically illustrated in FIG. 2. Briefly, transmission 12 has a "repeat-H" type of control wherein the operator's use of a range switch (not shown) will cause an automatic shifting of the range clutch by means of a two-position piston actuator 28 controlling the axial position of a shift yoke 30. Transmissions of this general type are well known in the prior art. The invention is also applicable to transmissions having a combined range- and splitter-type auxiliary section, such as those marketed by Eaton Corporation under the trademark "Super-10" and may be seen in greater detail by reference to aforementioned U.S. Pat. Nos. 4,944,197 and 5,231,895.

While the present invention is illustrated as utilized in a range-type auxiliary section utilizing a two-position actuator, it is understood that the present invention is also applicable to other types of synchronizer assembly applications, such as in the main section of a fully synchronized transmission under the control of a manual or automatic 3-position actuator, such as in the transmission illustrated in U.S. Pat. No. 5,092,439, the disclosure of which is incorporated herein by reference.

Figure 4:
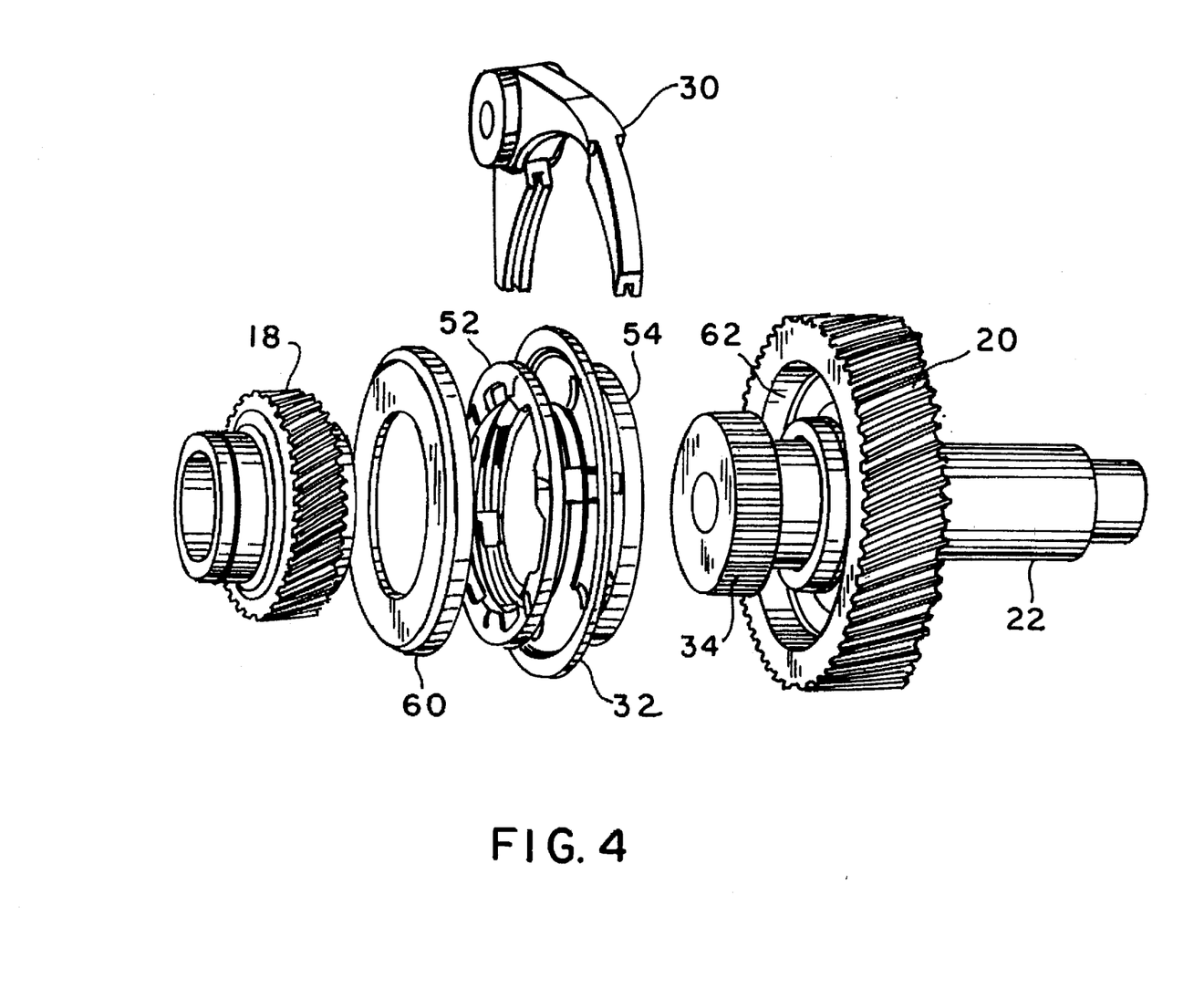
FIG. 4 is an exploded view of the double-acting pin-type synchronizer assembly of the present invention, as used in the transmission of FIG. 1.

Referring to FIGS. 3 and 4, it may be seen that the pin-type synchronizer assembly of the present invention, as is typical with pin-type synchronizer assemblies, includes an axially slidable clutch collar member 32 that is mounted for axial movement relative to and rotational movement with an externally splined portion 34 of the output shaft 22. The clutch collar is provided with jaw clutch teeth 36 and 38, which are adapted to be disposed in axial engagement with complementary jaw clutch teeth 40 and 42, respectively, formed on gears 18 and 20, respectively, for positively clutching a selected one of the gears to the output shaft 22. The clutch collar member includes a radially extending flange or plate member 44 having a plurality of circumferentially spaced openings or apertures therethrough which are parallel to the shaft. The apertures through sliding clutch collar plate 44 are grouped into a first set of generally equally circumferentially spaced apertures 46 and a second set of generally equally circumferentially spaced apertures 48, the two sets of which are offset in a predetermined manner.

Disposed through the apertures in the plate 44 are a plurality of synchronizer pin assemblies 50, which are fixed at each of their ends to a synchronizer ring 52 and 54, respectively, defining a conical friction surface for cooperation with a corresponding conical friction surface 56 and 58, respectively, associated with the gears 18 and 20, respectively. As may be seen, friction surface 56 is defined by a cup member 60 affixed to gear 18, while friction surface 58 is formed directly on an inner diameter surface 62 of gear 20. The synchronizer pin assemblies define a first set of synchronizer pins 64 and a second set of synchronizer pins 66, each set being generally equally circumferentially spaced in a manner corresponding to the circumferential spacing of the sets of apertures and the sets of pins being offset from one another, in a manner corresponding to the offset between the sets of apertures.

As is well known for the operation of pin-type synchronizers, the synchronizer rings 52 and 54 and the associated gear-mounted complementary conical surfaces 56 and 58, respectively, are intended to frictionally engage and cause the target gear and shaft 22 to rotate at substantially synchronous speeds and further to engage, prior to or during engagement of the baulking surfaces on the sliding clutch plate and associated synchronizer pin assemblies, to pre-energize the synchronizer assembly by causing synchronizer ring and synchronizer pin assembly to tend to rotate or "clock" with the target gear. To accomplish the pre-energizing function, there should be some means to assure that the conical friction surfaces of the synchronizer ring and the target gear ratio are brought into at least light frictional contact prior to or during the baulking surfaces' initial engagement, which is commonly referred to as "pre-energizing" of a synchronizer. In the known, commercially available prior art pin-type synchronizers, pre-energizing was accomplished by means of pre-energizing devices separate from the synchronizer pin assembly, which devices usually comprised spring pins, spring-biased plunger members and the like.

Referring especially to FIGS. 5, 6, 7 and 7A, it may be seen that the synchronizer rings 52 and 54 are connected to the synchronizer pin assemblies 64 and 66, the synchronizer pin assemblies 64 being a first set of three assemblies and the assemblies 66 being a second set of three assemblies. In the first set of assemblies, assemblies 64 are equally spaced circumferentially around the synchronizer rings 52 and 54 in known manner, as are assemblies 66 in the second set of assemblies, but the two sets of pin assemblies 64 and 66 are circumferentially offset relative to each other in a manner corresponding to the circumferential offset of the apertures 46 and 48 in the clutch plate 44, as is known in the art.

In FIGS. 7, 7A, 8, 8A, 9 and 9A, rightward and leftward movements represent axial movements, while upward and downward movements represent circumferential movements.

Each of the spring pin assemblies 64 includes a large diameter portion 68, a small diameter portion 70, and an intermediate diameter portion 72 interposed the large and small diameter portions. Reduced diameter peg portion 74 extends axially rightwardly from the small diameter portion 70 for receipt within aperture 76 provided in synchronizer ring 54, and a similar reduced diameter peg portion 78 extends axially leftwardly from the enlarged diameter portion 68 for receipt within aperture 80 provided in synchronizer ring 52. Preferably, the peg portions 74 and 78 are received within the apertures 76 and 80, respectively, in a press-fit/staked relationship. Synchronizer pin assemblies 66 are substantially functionally and structurally identical to synchronizer pin assemblies 64 but are oriented in an opposite manner relative to the synchronizer rings. Briefly, synchronizer pin assembly 66 comprises a large diameter portion 82, a small diameter portion 84, and an intermediate diameter portion 86 interposed the large and small diameter portions. Reduced diameter peg portions 88 and 90, respectively, are provided for press-fit/staked receipt within apertures 92 and 94, respectively, provided in the synchronizer ring 54 and 52, respectively.

Figure 5:
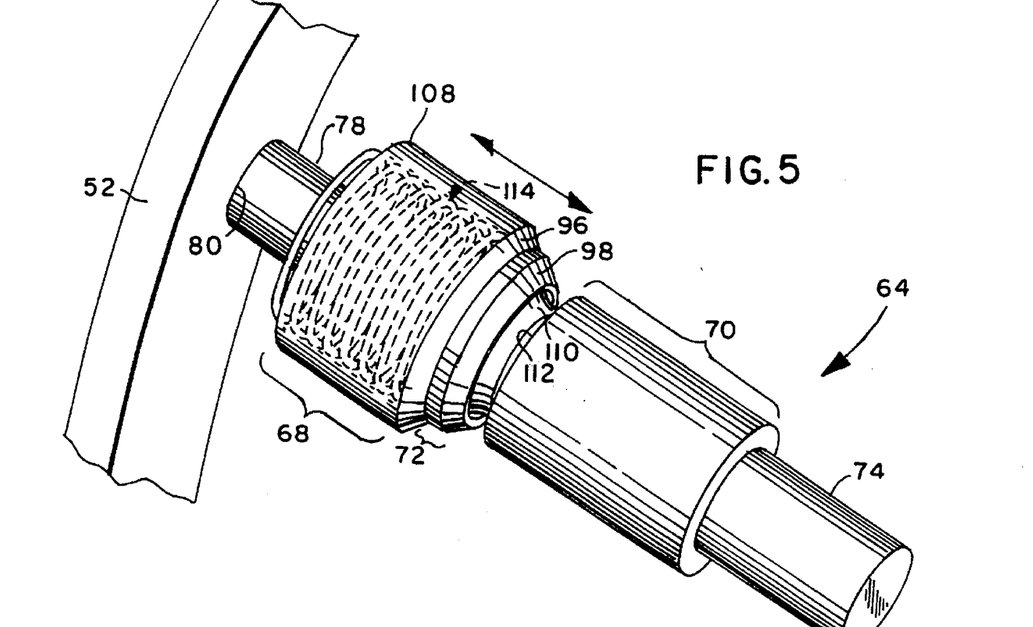
FIG. 5 is a perspective view illustrating the synchronizer pin assembly structure of the present invention.
Figure 6:
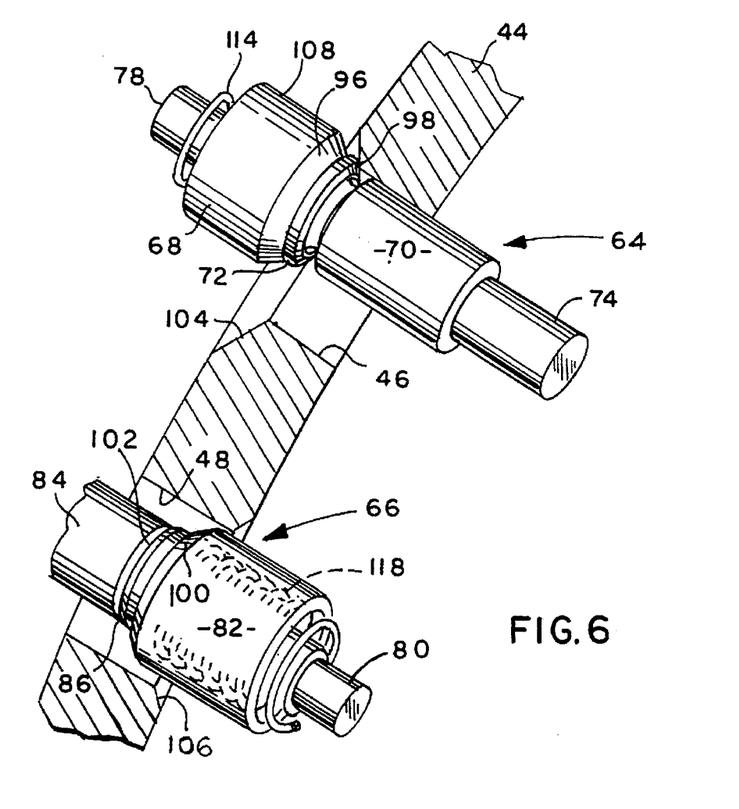
FIG. 6 is a perspective view illustrating the relationship between the two sets of synchronizer pin assemblies and the sliding clutch plate apertures associated therewith.

On synchronizer pin assembly 64, ramped surfaces 96 and 98, respectively, extend between the enlarged diameter outer surface and the intermediate diameter outer surface, and the intermediate diameter surface and the small diameter surface 70 of pin assembly 64, respectively, while on assembly 66, ramped, inclined surfaces 100 and 102, respectively, extend from the enlarged diameter outer surface to the intermediate diameter outer surface, and the intermediate diameter surface and the small diameter surface, respectively. The leftward end of aperture 46 and the rightward end of aperture 48 in the clutch collar plate 44, respectively, are provided with radially outwardly extending ramped surfaces 104 and 106, respectively, for interaction with the ramped surfaces 96 and 100, respectively. Ramps 104 at the leftward ends of apertures 46 through clutch plate 44 and ramps 96 of the synchronizer pin assemblies 64 provide the baulking ramp function for engagement of gear 18 in the known manner for pin-type synchronizers, while ramps 106 at the rightward end of apertures 48 through the clutch plate 44 and ramps 100 on the synchronizer pins 66 provide the baulking ramp function for engagement of gear 20 in the known manner for pin-type synchronizer assemblies.

The enlarged diameter outer surface of portion 68, ramp 96, the outer diameter surface of intermediate diameter portion 72 and ramp 98 all are defined on the outer diameter surface of a collar or sleeve member 108 axially slidable on the outer surface 110 of a shaft portion 112 extending axially between the small diameter portion 70 and peg portion 78 of synchronizer pin assembly 64. A shoulder 112 limits the rightward axial travel of collar 108, while a resilient biasing means, such as coil spring 114 seated on synchronizer ring 52, resiliently biases the collar 108 rightwardly against the stop 112. Similarly, the outer diameter surfaces of enlarged diameter portion 82, intermediate diameter portion 86, ramp 100 and ramp 102 of synchronizer pin assembly 66 are defined by the outer surface of a collar or sleeve 116 axially slidable on the outer diameter surface 118 of a shaft portion 120 of the assembly 66. A shoulder 122 limits leftward axial travel of the sleeve 116, and a coil spring 124 extending between the synchronizer ring 54 and a spring seat 126 defined by the collar 116 resiliently biases the collar 116 leftwardly against the shoulder 122.

Figure 7:
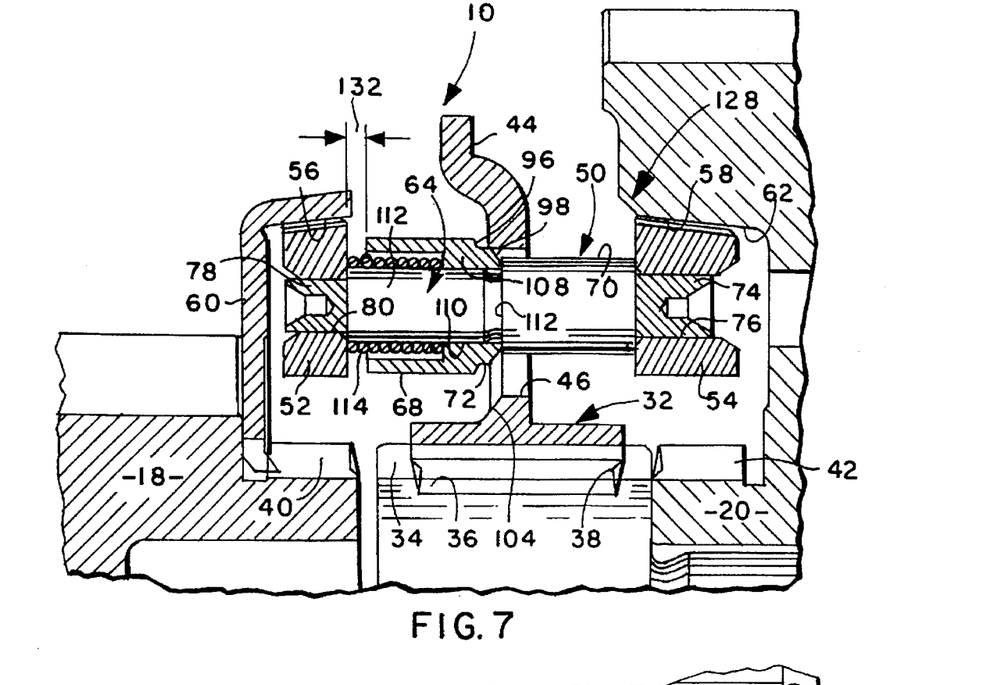
FIGS. 7, 7A, 8, 8A, 9, 9A and 10 are partial sectional views illustrating a sequence of synchronizer assembly operation during engagement of the direct ratio.
Figure 7A:
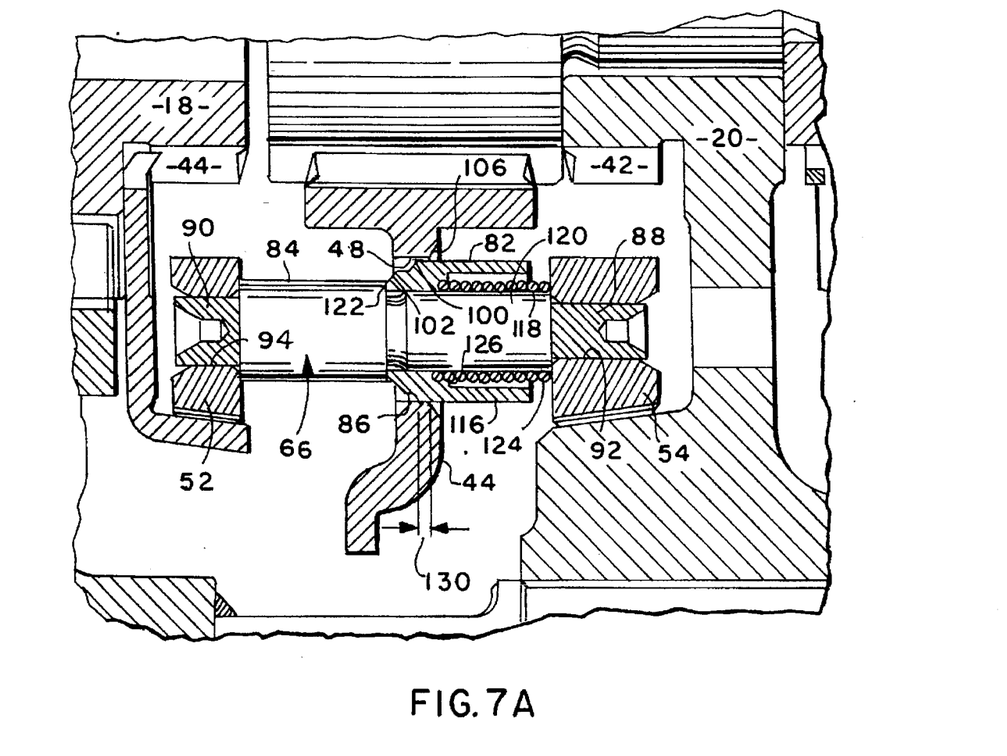

As may best be seen by reference to FIGS. 7-7A, when apertures 46 in the clutch plate 44 are axially aligned with the small diameter portion 70 of the spring pin assemblies 64, the synchronizer pin and ring assembly (i.e., synchronizer ring 52, synchronizer ring 54, spring pin assemblies 64 and spring pin assemblies 66) is free to rotate sufficiently to circumferentially align the large diameter portions 82 of the spring pin assemblies 66 with the apertures 48 through the clutch plate 44. Circumferential alignment between a pin portion and an aperture implies that the pin portion will pass through the aperture even if not coaxial therewith.

Figure 8:
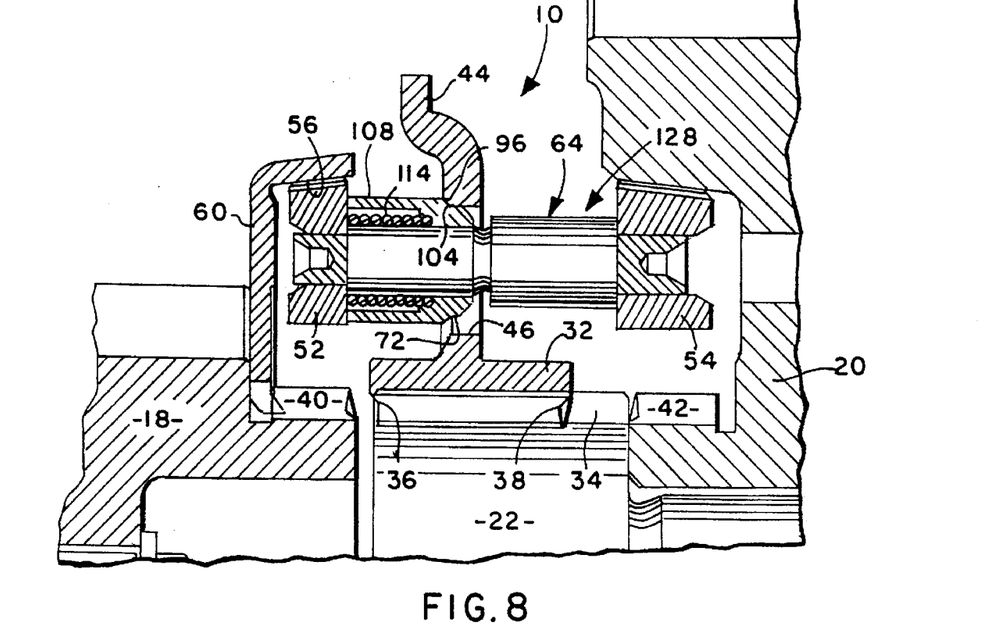
Figure 8A:
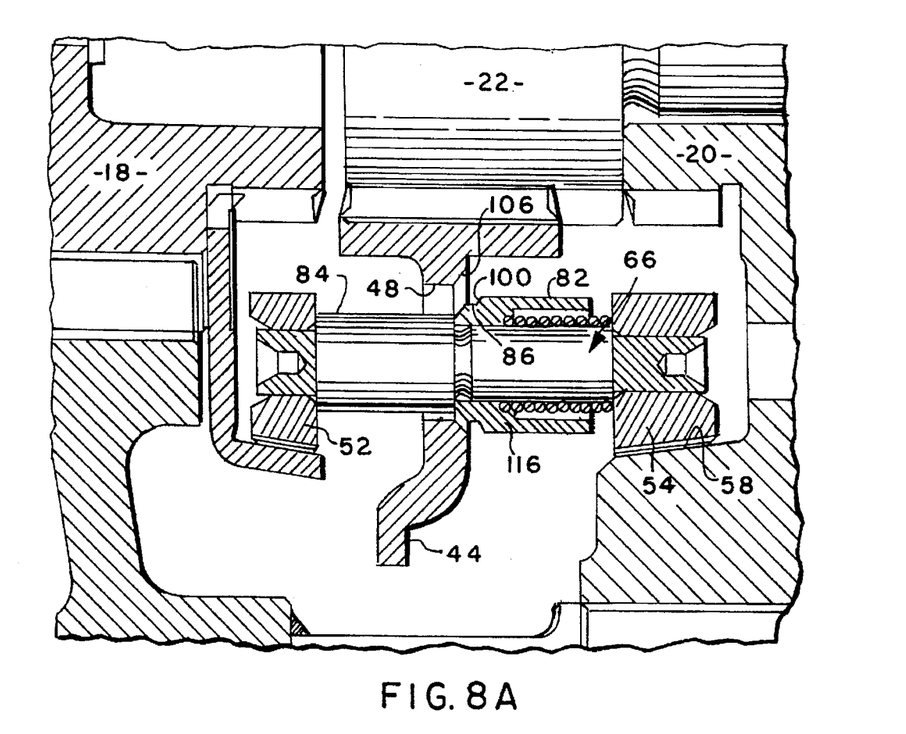

As may best be seen by reference to FIGS. 8-8A, when apertures 46 of the clutch plate 44 are circumferentially aligned with the intermediate diameter portions 72 of the synchronizer pin assemblies 64, the synchronizer pin and ring assembly 128 is not free to rotate sufficiently to circumferentially align the intermediate diameter portions 86 of the spring pin assemblies 66 with apertures 48 and clutch plate 44 or to circumferentially align the apertures 48 with the large diameter portion 82 of the spring pin assemblies 66. It is noted that the large diameter portions 68 and 82 of spring pin assemblies 64 and 66, respectively, are of a diameter generally equal to the diameter of apertures 46 and 48, respectively, through the clutch plate 44.

Figure 9:
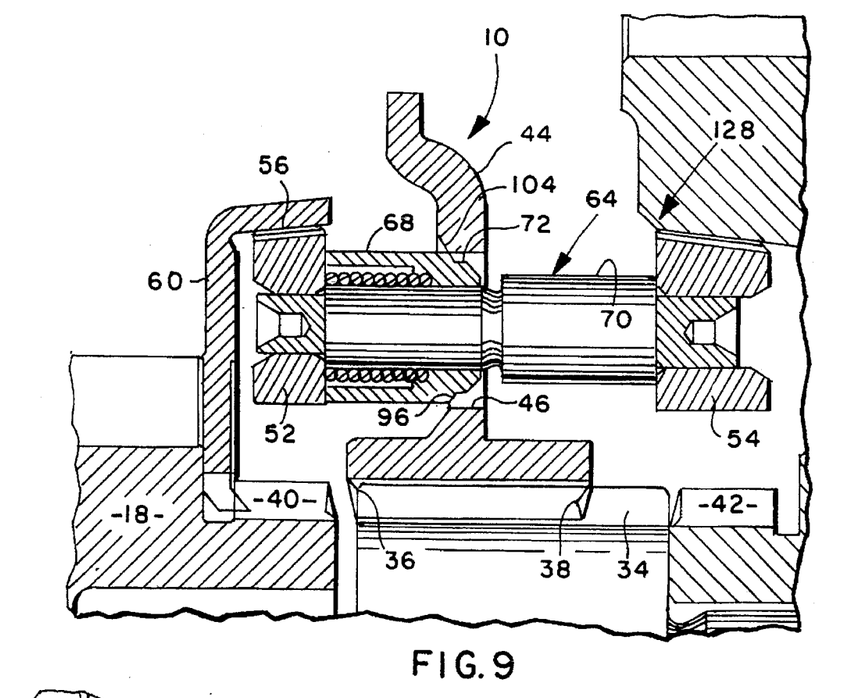
Figure 9A:
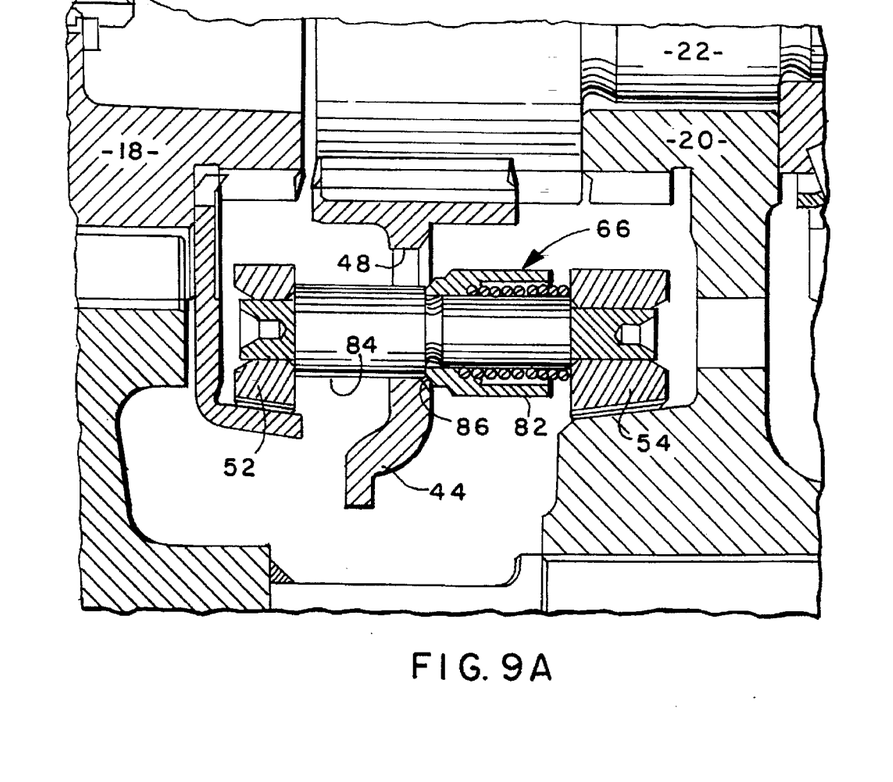

As may best be seen by reference to FIGS. 9-9A, when the apertures 46 in the clutch plate 44 are circumferentially aligned with the large diameter portions 72 of the synchronizer pin assemblies 64, the synchronizer pin and ring assembly 128 has limited rotational freedom relative to the clutch plate 44 and cannot rotate sufficiently relative thereto to align either the intermediate diameter portion 86 or large diameter portion 82 of spring pin assemblies 66 with aperture 48.

Referring again to FIGS. 8-8A, it may be seen that there is a position wherein the clutch teeth 36 and 38 of the sliding clutch 32 are disengaged from the clutch teeth 40 and 42, respectively, carried by gears 18 and 20, respectively, and wherein the synchronizer ring and pin assembly 128 is free to and/or forced to rotate or clock relative to the clutch plate 44 sufficiently to circumferentially misalign either of the intermediate or large diameter portions of the sets of synchronizer pin assemblies 64 or 66 with their associated apertures 46 or 48, respectively, in the clutch plate. This will tend to assure that as one of the gears is disengaged and engagement of the other gear is initiated, should the operator change his mind and decide to reengage the previously disengaged gear, the synchronizing mechanism baulking means will operate properly to prevent crash shifting.

The operation of the pin-type synchronizer assembly 10 of the present invention is illustrated in sequential form by reference to FIGS. 7-7A, 8-8A, 9-9A and 10. The sequence illustrated is that of disengaging range reduction gear 20 from output shaft 22 and engaging range direct gear 18 to the output shaft 22. It is noted that for a range-type, synchronized, double-acting clutch assembly operated by a two-position piston actuator 28, the assembly will not be intentionally positioned or dwell in an intermediate or neutral position.

In FIGS. 7-7A, the sliding clutch collar portion 32 of the sliding clutch has been moved leftwardly sufficiently to disengage clutch teeth 38 from the clutch teeth 42 carried by gear 20, and the apertures 48 and clutch plate 44 are still aligned with and in contact with the outer diameter surface of large diameter portion 82 of the spring pin assemblies 66 and will remain in contact therewith during continued axial leftward travel of the clutch plate 44 for an axial distance 130 equal to about 0.045-0.075 inch. Simultaneously, the ramped portions 104 of the set of apertures 46 have contacted the ramps 98 on the spring pin assemblies 64 intermediate the small diameter portion 70 and intermediate diameter portion 72 thereof. During the next axial leftward travel of distance 130, the ring and pin assembly 128 is not free to rotate sufficiently to cause apertures 46 to circumferentially align with intermediate diameter portions 72 of pin assemblies 64. Accordingly, further axial movement of the clutch collar 44 in the leftward direction from the position shown in FIGS. 7-7A will cause axial displacement of the sliding collar 108 against the bias of spring 114, which will result in urging of the synchronizer ring and synchronizer pin assembly 128 leftwardly to urge the conical friction surfaces of synchronizer ring 52 into frictional contact with the corresponding surface 56 of cup 60 associated with gear 18, while simultaneously urging the synchronizer ring 54 leftwardly and out of contact with the friction surface 58 defined on the inner diameter surface 62 of gear 20. In the non-displaced position of sleeve 108, sleeve 108 has a clearance 132 for leftward movement of about 0.090–0.125 inch, which is greater than the axial distance 130. Further axial movement of the clutch 32 leftwardly toward gear 18, thus, will result in resilient axial displacement of collar 108, which will result in bringing the synchronizer ring 52 into frictional engagement with inner conical surface 56 defined by cup 60 carried by gear 18.

In FIGS. 8–8A, the sliding clutch 32 has been moved leftwardly from the position shown in FIGS. 7–7A sufficiently to cause aperture set 48 to axially clear the large diameter portions 82 of the synchronizer pin set 66 and further to resiliently axially leftwardly displace the collar 108 of the synchronizer pin set 64, resulting in the synchronizer ring and synchronizer pin assembly 128 being pre-energized to tend to rotate with gear 18, which, due to the assumed non-synchronous rotation therebetween, causes the baulking surfaces to be urged into contact, preventing further leftward axial movement of the clutch 32 and applying a frictional force between surfaces 56 and 52 to tend to cause the gear 18 and shaft 22 to rotate at substantially the same speed. It is noted that in this axial position of the clutch 32, the apertures 48 are axially aligned with the small diameter portions 84 of synchronizer pin assemblies 66, thus allowing the synchronizer ring and pin assembly 128 to be free to rotate relative to the clutch plate 44 sufficiently to circumferentially align apertures 46 with the large diameter portions 68 of the spring pin set 64.

Even in the full leftwardly displaced axial position of collar 108, until an unblocking of the baulking ramps 104 and 96, the positive clutch teeth 36 and 40 are not permitted to engage.

Figure 10:
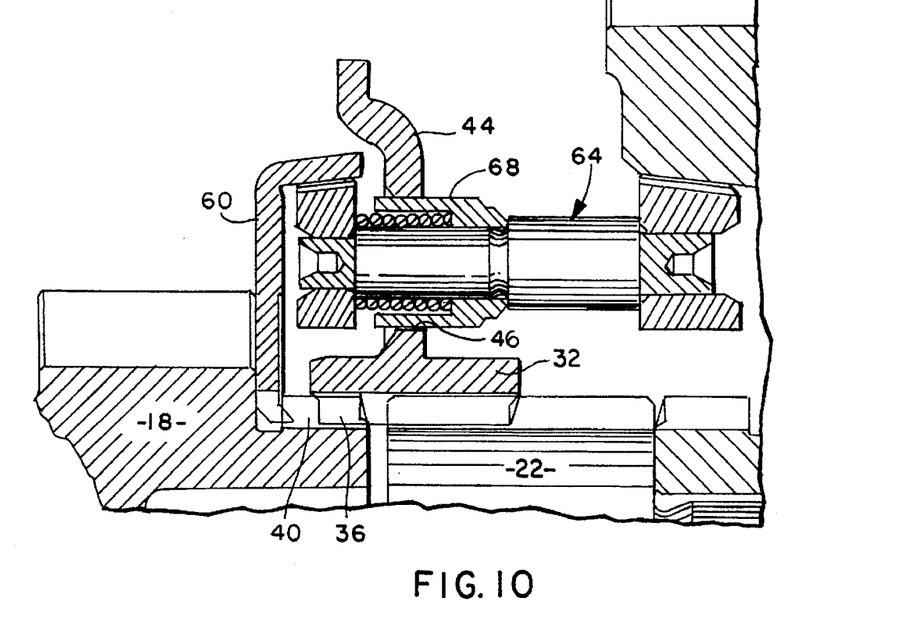

Referring to FIGS. 9–9A, as the frictional force across conical surface 56 and the corresponding surface of synchronizer ring 52 causes the gear 18 and output shaft 22 to rotate at a substantially synchronous speed, continued leftward axial force on the clutch plate 44 will cause the inclined surfaces of the baulking ramps 104 and 96 to cause the synchronizer ring and pin assembly 128 to clock or index slightly relative to the clutch plate 44 sufficiently to align the apertures 46 in the clutch plate with the large diameter portion 68 with the set of synchronizer pin assemblies 64, or to unblock, allowing further leftward movement of the clutch collar 32 to cause the clutch teeth 36 carried thereby to engage to clutch teeth 40 carried by gear 18 to engage the gear 18 to output shaft 22, as is seen in FIG. 10. The clocking or indexing, as is known, is a function of rotational speed differences, baulking ramp angles and friction cone angles.

Referring again to FIGS. 8–8A, when either one of the apertures 46 or 48, respectively, is circumferentially aligned with the intermediate diameter portions 72 and 86, respectively, of its associated synchronizer pin assembly 64 or 66, respectively, the synchronizer ring and pin assembly 128 is positively prevented from rotation relative to clutch plate 44 sufficiently to cause circumferential alignment of the large diameter portion of the other of the pin assemblies with the apertures associated therewith. Additionally, should the operator decide to reengage gear 20 to output shaft 22 after initiation of engagement of gear 18 to output shaft 22, rightward movement of the clutch collar 32 from the position shown in FIGS. 8–8A will cause continued engagement between aperture 46 and intermediate diameter portion 72 of spring pin 64, as first the collar 108 moves rightwardly under the bias of the spring 114 until the collar contacts the shoulder 112, and then for a distance equal to the axial length of the intermediate diameter portion, which will cause the baulking ramps 100 and 106 to come into and remain in contact and cause a rightward axial displacement of collars 116 of the synchronizer pin assemblies 66 and pre-energizing contact between the synchronizer ring 54 and the conical surface 58 on the gear 20. This will properly set up the ring and pin assembly 128 relative to the clutch collar plate 44 prior to any possibility of the baulking surfaces indexing into an unblocked circumferential position to avoid crash engagement of the previously engaged gear ratio.

Figure 11:
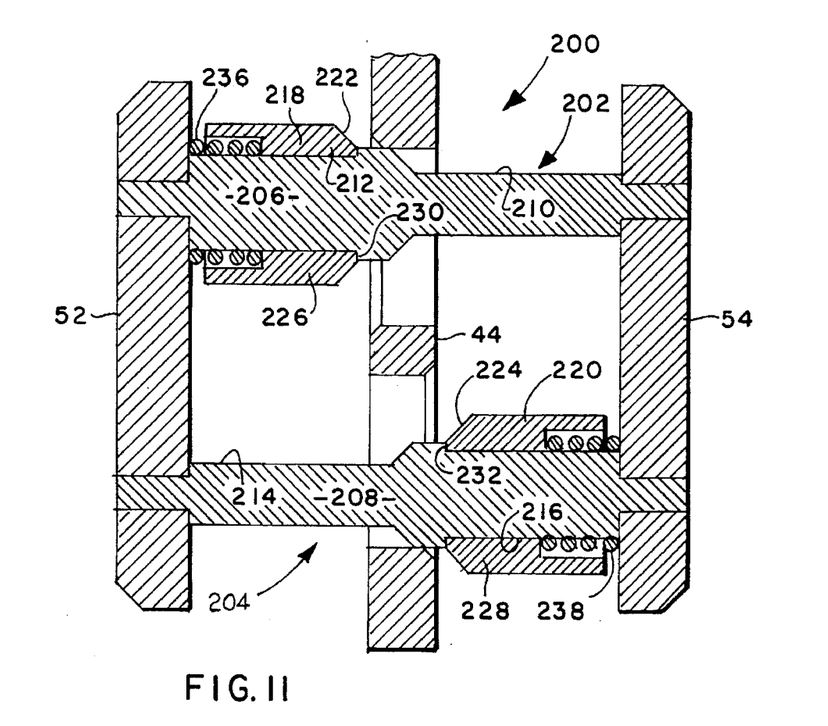
FIG. 11 is a schematic illustration of an alternate embodiment of the present invention.

A schematic representation of an alternate embodiment of the present invention may be seen by reference to FIG. 11. In FIG. 11, a pin-type synchronizer assembly 200 utilizes synchronizer rings 52 and 54 and a clutch collar plate 44 substantially structurally and functionally identical to the synchronizer ring and clutch plate described above in reference to the synchronizer assemblies 10 illustrated in FIGS. 5–10. Embodiment 200 differs in that the spring pin assemblies 202 and 204 each comprises shaft portions 206 and 208, respectively, which define the small diameter portions and intermediate diameter portions 210 and 212, 214 and 216, respectively, thereof. The enlarged diameter portions thereof, 218 and 220, respectively, and the baulking ramps associated therewith, 222 and 224, respectively, are defined on sleeve members 226 and 228, respectively, which are axially slidable on the intermediate diameter portions 212 and 216, respectively, and are urged axially inwardly against stop members 230 and 232, respectively, by biasing springs 234 and 236, respectively. Apart from these structural differences, the function and operation of synchronizer assembly 200 is substantially identical to the operation of pin-type synchronizer assembly 10 described above.

Figure 12:
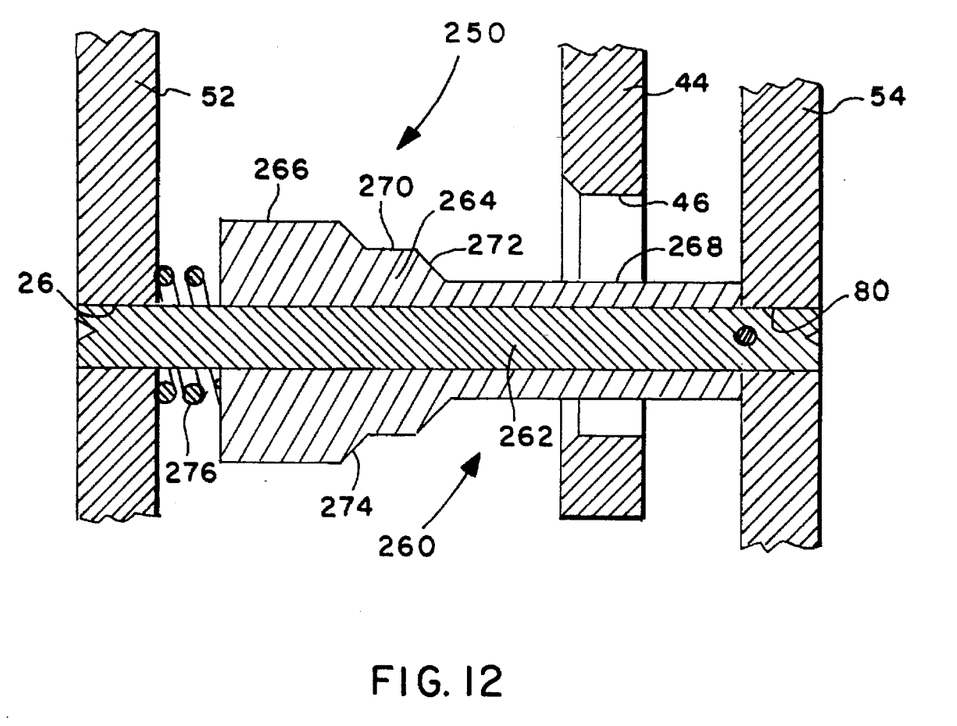
FIG. 12 is a schematic illustration of a further alternate embodiment of the present invention.

A further alternate embodiment of the present invention is schematically illustrated in FIG. 12. Pin-type synchronizer assembly 250 includes synchronizer rings 52 and 54 and clutch plate 44 having aperture 46 therein, all of which are structurally and functionally substantially identical to the synchronizer rings and clutch plate described above in connection with synchronizer assembly 10. Pin-type synchronizer assembly 250 utilizes a synchronizer pin assembly 260 comprising a single substantially constant diameter shaft 262, which is received in apertures 76 and 80 in the synchronizer rings 50 and 52, respectively, preferably in a press-fit/staked relationship. Axially slidable on the outer diameter of shaft 262 is a collar 264 having an outer diameter surface defining a large diameter surface 266, a small diameter surface 268, an intermediate diameter surface 270, ramp 272 between surfaces 268 and 270, and ramp 274 between surfaces 270 and 266. Collar 264 is of a shorter axial distance than the separation between the synchronizer rings 52 and 54, and is resiliently biased by a spring 276 axially away from the synchronizer ring 52 associated therewith. Apart from the above-noted structural differences, the function and operation of synchronizer 250 and of synchronizer pin assemblies 260 associated therewith is identical to that of the synchronizer assembly 10 described above.

From the foregoing, it is believed that those familiar with the art will recognize and appreciate the novel concepts and features of the improved pin-type synchronizer assembly and the synchronizer pin assembly used therewith. While the present invention has been described in relation to only certain preferred embodiments, numerous variations, changes and substitutions and equivalents will present themselves to persons skilled in the art and may be made without departing from the spirit and the scope of the present invention.

I claim:

1. A synchronizer pin assembly for a pin-type synchronizer assembly comprising a first synchronizer ring and a clutch plate axially movable toward and away from said synchronizer ring, said synchronizer pin assembly mounted at one end thereof to said first synchronizer ring and said clutch plate defining an aperture therethrough having an aperture inner diameter for receipt of said synchronizer pin assembly, said synchronizer pin assembly having a large outer diameter surface portion adjacent said one end thereof, a small outer diameter surface portion and an intermediate outer diameter surface portion interposed axially between said large outer diameter surface portion and said small outer diameter surface portion, said large outer diameter surface portion being smaller than the inner diameter of said aperture, baulking ramp means defined by an inclined surface extending radially outwardly and toward said one end from said intermediate outer diameter surface portion to said large outer diameter surface portion, said baulking ramp means on said pin assembly adapted for cooperation with complementary baulking ramp means provided at an entrance to said aperture, said large outer diameter surface portion axially movable relative to said synchronizer ring and stop means being provided on said synchronizer pin assembly for limiting axial movement of said large outer diameter surface portion away from said first synchronizer ring, said large outer diameter surface portion axially offset said first synchronizer ring when engaged with said stop means.

2. The synchronizer pin assembly of claim 1 further comprising resilient biasing means for resiliently biasing said large outer diameter surface portion axially away from said first synchronizer ring.

3. The synchronizer pin assembly of claim 2 wherein said resilient biasing means is a coil spring intended to be received in compression between a spring seat carried by said large outer diameter surface portion and a spring seat defined by said synchronizer ring.

4. The synchronizer pin assembly of claim 1 wherein said synchronizer assembly includes a second synchronizer ring axially spaced from said first synchronizer ring and said synchronizer pin assembly is mounted at the other end thereof to said second synchronizer ring.

5. The synchronizer pin assembly of claim 4 wherein said resilient biasing means is a coil spring intended to be received in compression between a spring seat carried by said large outer diameter surface portion and a spring seat defined by said synchronizer ring.

6. A double-acting pin-type synchronizer assembly for selectively engaging a selected one of two selectable, rotatable members to a relatively rotatable shaft;

a first and a second synchronizer ring for frictional engagement with a first and second complementary friction surface, respectively, carried by said first and second rotatable members, respectively;

at least one first synchronizer pin assembly fixed at a first end thereof to said first synchronizer ring and extending axially toward said second synchronizer ring, at least one second synchronizer pin assembly fixed at a first end thereof to said second synchronizer ring and extending axially toward said first synchronizer ring;

a sliding clutch member fixed for rotation with and axially movable relative to said shaft, said clutch member axially moved toward said first synchronizer ring to engage said first rotatable member to said shaft and axially moved toward said second synchronizer ring to engage said second rotatable member to said shaft, said clutch member including a generally radially extending clutch plate having a first axially extending aperture therethrough having a first inner diameter for receipt of said first synchronizer pin assembly and a second axially extending aperture therethrough having a second inner diameter for receipt of said second synchronizer pin assembly;

said first synchronizer pin assembly having a first large outer diameter portion adjacent said first end thereof, a first small outer diameter portion extending toward said second synchronizer ring, and a first intermediate outer diameter portion interposed axially between said first large outer diameter portion and said first small outer diameter portion, said first large outer diameter portion being of an outer diameter smaller than said first inner diameter, said first large outer diameter portion axially movable relative to said first synchronizer ring and first stop means for limiting axial movement of said first large outer diameter portion away from said first synchronizer ring, said first large outer diameter portion axially offset said first synchronizer ring when engaged with said first stop means;

said second synchronizer pin assembly having a second large outer diameter portion adjacent said first end thereof, a second small outer diameter portion extending toward said first synchronizer ring, and a second intermediate outer diameter portion axially interposed between said second large outer diameter portion and said second small outer diameter portion, said second large outer diameter portion being of an outer diameter smaller than said second inner diameter, said second large outer diameter portion axially movable relative to said second synchronizer ring and second stop means for limiting axial movement of said second large outer diameter portion away from said second synchronizer ring, said second large outer diameter portion axially offset said second synchronizer ring when engaged with said second stop means; and first and second resilient biasing means, respectively, for resiliently biasing said first and second large outer diameter portions, respectively, away from said first and second synchronizer rings, respectively;

said first and second pin assemblies and said first and second apertures arranged such that if said large or intermediate outer diameter portion of one of said pin assemblies is received in its associated aperture, only the intermediate or small outer diameter portion of the other of the pin assemblies can be received in its associated aperture.

7. The pin-type synchronizer assembly of claim 6 wherein if said first aperture is circumferentially aligned with the first intermediate outer diameter portion, said second aperture is circumferentially misaligned with the second large outer diameter portion, and if said second aperture is circumferentially aligned with the second intermediate outer diameter portion, then said first aperture is circumferentially misaligned with the first large outer diameter portion.

8. A double-acting pin-type synchronizer assembly for selectively engaging a selected one of two selectable, rotatable members to a relatively rotatable shaft;

a first and a second synchronizer ring for frictional engagement with a first and second complementary friction surface, respectively, carried by said first and second rotatable members, respectively;

at least one first synchronizer pin assembly fixed at a first end thereof to said first synchronizer ring and extending axially toward said second synchronizer ring, at least one second synchronizer pin assembly fixed at a first end thereof to said second synchronizer ring and extending axially toward said first synchronizer ring;

a sliding clutch member fixed for rotation with and axially movable relative to said shaft, said clutch member including a first set of clutch teeth for engagement with complementary clutch teeth carried by said first rotatable member and axially moved toward said first synchronizer ring to engage said first rotatable member to said shaft and a second set of clutch teeth for engagement with complementary clutch teeth carried by said second rotatable member and axially moved toward said second synchronizer ring to engage said second rotatable member to said shaft, said clutch member including a generally radially extending clutch plate having a first axially extending aperture therethrough having a first inner diameter for receipt of said first synchronizer pin assembly and a second axially extending aperture therethrough having a second inner diameter for receipt of said second synchronizer pin assembly;

said first synchronizer pin assembly having a first large outer diameter portion adjacent said first end thereof, a first small outer diameter portion extending toward said second synchronizer ring, and a first intermediate outer diameter portion interposed axially between said first large outer diameter portion and said first small outer diameter portion, said first large outer diameter portion being of an outer diameter smaller than said first inner diameter, first baulking ramp means defined by an inclined surface extending radially outwardly and toward said first end thereof from said first intermediate outer diameter portion to said first large outer diameter portion, said first baulking ramp means adapted for cooperation with complementary baulking ramp means provided at the entrance to said first aperture remote from said first synchronizer ring, engagement of said first baulking ramp means with the baulking ramp means defined in said first aperture sufficient to prevent engagement of said first set of clutch teeth with the clutch teeth carried by said first rotatable member for all axial positions of said first large diameter portion, said first large outer diameter portion axially movable relative to said first synchronizer ring and first stop means for limiting axial movement of said first large outer diameter portion away from said first synchronizer ring, said first large outer diameter portion axially offset said first synchronizer ring when engaged with said first stop means;

said second synchronizer pin assembly having a second large outer diameter portion adjacent said first end thereof, a second small outer diameter portion extending toward said first synchronizer ring, and a second intermediate outer diameter portion axially interposed between said second large outer diameter portion and said second small outer diameter portion, said second large outer diameter portion being of an outer diameter smaller than said second inner diameter, second baulking ramp means defined by an inclined surface extending radially outwardly and toward said first end thereof from said second intermediate outer diameter portion to said second large outer diameter portion, said second baulking ramp means adapted for cooperation with complementary baulking ramp means provided at the entrance to said second aperture remote from said second synchronizer ring, engagement of said second baulking ramp means with the baulking ramp means defined in said second aperture sufficient to prevent engagement of said second set of clutch teeth with the clutch teeth carried by said second rotatable member for all axial positions of said second large outer diameter portion, said second large outer diameter portion axially movable relative to said second synchronizer ring and second stop means for limiting axial movement of said second large outer diameter portion away from said second synchronizer ring, said second large outer diameter portion axially offset said second synchronizer ring when engaged with said second stop means; and first and second resilient biasing means, respectively, for resiliently biasing said first and second large outer diameter portions, respectively, away from said first and second synchronizer rings, respectively.

9. The pin-type synchronizer assembly of claim 8 wherein said first synchronizer pin assembly is fixed at the second end thereof to said second synchronizer ring, said second synchronizer pin assembly is fixed at the second end thereof to said first synchronizer ring, whereby said first and second synchronizer pin assemblies and said first and second synchronizer rings define a synchronizer ring and pin assembly rotatable as a unit.

10. The pin-type synchronizer assembly of claim 9 wherein said clutch plate has an axial position intermediate said first and second synchronizer rings wherein said first and second sets of clutch teeth are disengaged from the clutch teeth carried by said first and second rotatable members and wherein said synchronizer pin and ring assembly is free to rotate relative to said shaft sufficiently to cause either of the first and second large outer diameter portions to become circumferentially misaligned with said first and second apertures, respectively.

11. The pin-type synchronizer assembly of claim 9 wherein axial movement of said clutch member away from said first synchronizer ring sufficient to cause axial alignment of said clutch plate with the first intermediate outer diameter portion will cause said synchronizer ring and pin assembly to assume a circumferential position relative to said clutch plate wherein subsequent axial movement of said clutch member toward said first synchronizer ring to cause engagement of said first set of clutch teeth with the complementary clutch teeth carried by said first rotatable member will require axial displacement of said first large outer diameter portion toward said first synchronizer ring and subsequent axial movement of said clutch member toward said second synchronizer ring to cause engagement of said second set of clutch teeth with the complementary clutch teeth carried by said second rotatable member will require axial displacement of the second large outer diameter portion toward said second synchronizer ring.

12. The pin-type synchronizer assembly of claim 9 wherein:

axial alignment of said clutch plate with the first small outer diameter portion will allow said ring and pin assembly to rotate for circumferential alignment of said second aperture with the second large outer diameter portion, second intermediate outer diameter portion or second small outer diameter portion;

axial alignment of said clutch plate with the first intermediate outer diameter portion will allow said ring and pin assembly to rotate for circumferential alignment of said second aperture with the second intermediate outer diameter portion and second small outer diameter portion, but not for circumferential alignment with said second large outer diameter portion; and axial alignment of said clutch plate with the first large outer diameter portion will allow said ring and pin assembly to rotate sufficiently to circumferentially align said second aperture with the second small outer diameter portion, but not said second intermediate or large outer diameter portions.

13. The pin-type synchronizer assembly of claim 9 wherein axial movement of said clutch member from an axial position sufficient to engage one of said first and second sets of clutch teeth with its complementary clutch teeth on one of said rotatable members to a position to engage the other of said first and second sets of clutch teeth with its complementary clutch teeth on the other of said rotatable members will cause said clutch plate to assume a position wherein both of said first and second large diameter portions are circumferentially misaligned with said first and second apertures, respectively, and will remain misaligned with said first and second apertures, respectively, until axially displaced away from its stop member and toward the synchronizer ring fixed to the first end of the pin assembly associated therewith.

14. The pin-type synchronizer assembly of claim 13 wherein if said first aperture is circumferentially aligned with the first intermediate outer diameter portion, said second aperture is circumferentially misaligned with the second large outer diameter portion, and if said second aperture is circumferentially aligned with the second intermediate outer diameter portion, then said first aperture is circumferentially misaligned with the first large outer diameter portion.

15. The pin-type synchronizer assembly of claim 13 wherein axial movement of said clutch member away from said first synchronizer ring sufficient to cause axial alignment of said clutch plate with the first intermediate outer diameter portion will cause said synchronizer ring and pin assembly to assume a circumferential position relative to said clutch plate wherein subsequent axial movement of said clutch member toward said first synchronizer ring to cause engagement of said first set of clutch teeth with the complementary clutch teeth carried by said first rotatable member will require axial displacement of said first large outer diameter portion toward said first synchronizer ring and subsequent axial movement of said clutch member toward said second synchronizer ring to cause engagement of said second set of clutch teeth with the complementary clutch teeth carried by said second rotatable member will require axial displacement of the second large outer diameter portion toward said second synchronizer ring.

16. The pin-type synchronizer assembly of claim 9 wherein if said first aperture is circumferentially aligned with the first intermediate outer diameter portion, said second aperture is circumferentially misaligned with the second large outer diameter portion, and if said second aperture is circumferentially aligned with the second intermediate outer diameter portion, then said first aperture is circumferentially misaligned with the first large outer diameter portion.

17. The pin-type synchronizer assembly of claim 8 wherein axial movement of said clutch member from an axial position sufficient to engage one of said first and second sets of clutch teeth with its complementary clutch teeth on one of said rotatable members to a position to engage the other of said first and second sets of clutch teeth with its complementary clutch teeth on the other of said rotatable members will cause said clutch plate to assume a position wherein both of said first and second large diameter portions are circumferentially misaligned with said first and second apertures, respectively, and will remain misaligned with said first and second apertures, respectively, until axially displaced away from its stop member and toward the synchronizer ring fixed to the first end of the pin assembly associated therewith.

18. The pin-type synchronizer assembly of claim 8 wherein axial movement of said clutch member away from said first synchronizer ring sufficient to cause axial alignment of said clutch plate with the first intermediate outer diameter portion will cause said synchronizer ring and pin assembly to assume a circumferential position relative to said clutch plate wherein subsequent axial movement of said clutch member toward said first synchronizer ring to cause engagement of said first set of clutch teeth with the complementary clutch teeth carried by said first rotatable member will require axial displacement of said first large outer diameter portion toward said first synchronizer ring and subsequent axial movement of said clutch member toward said second synchronizer ring to cause engagement of said second set of clutch teeth with the complementary clutch teeth carried by said second rotatable member will require axial displacement of the second large outer diameter portion toward said second synchronizer ring.

19. The pin-type synchronizer assembly of claims 6, 9, 13, 18 or 12, comprising a plurality of equally circumferentially spaced first synchronizer pin assemblies, and a like plurality of similarly equally circumferentially spaced first apertures, and a plurality of equally circumferentially spaced second synchronizer pin assemblies, and a like plurality of similarly equally circumferentially spaced second apertures.

20. The pin-type synchronizer assembly of claims 6, 9, 13 or 18, wherein said first and second synchronizer pin assemblies are identical.

21. The pin-type synchronizer assembly of claims 6, 9, 13 or 18, wherein said first and second members are gears rotationally supported about said rotatable shaft.

22. The pin-type synchronizer assembly of claims 9, 10, 13 or 12, wherein said first large outer diameter portion and first intermediate outer diameter portion are axially movable as a unit, and said second large outer diameter portion and second intermediate outer diameter portion are axially movable as a unit.

23. The pin-type synchronizer assembly of claim 22 wherein, with said first and second large outer diameter portions, respectively, axially positioned against said first and second stops, respectively, at initial axial alignment of said clutch plate with said first intermediate outer diameter portion, the clutch plate will be in continued axial alignment with said second large outer diameter portion.

* * * * *